US008013818B2

(12) United States Patent
You

(10) Patent No.: US 8,013,818 B2
(45) Date of Patent: Sep. 6, 2011

(54) LIQUID CRYSTAL DISPLAY DEVICE AND METHOD OF DRIVING THE SAME

(75) Inventor: Sook Kyung You, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1253 days.

(21) Appl. No.: 11/452,257

(22) Filed: Jun. 14, 2006

(65) Prior Publication Data

US 2006/0290831 A1    Dec. 28, 2006

(30) Foreign Application Priority Data

Jun. 22, 2005  (KR) .................. 10-2005-0053818

(51) Int. Cl.
  *G09G 3/36* (2006.01)
(52) U.S. Cl. .......................................... 345/87; 345/690
(58) Field of Classification Search .................. 345/204, 345/690, 87–100; 349/80, 104–109
  See application file for complete search history.

(56) References Cited

U.S. PATENT DOCUMENTS

| 6,778,160 | B2 * | 8/2004 | Kubota et al. ................ 345/89 |
| 7,224,351 | B2 * | 5/2007 | Lee ................................. 345/205 |
| 7,277,075 | B1 * | 10/2007 | Hirano et al. ................ 345/89 |
| 2003/0085859 | A1 | 5/2003 | Lee |
| 2004/0095521 | A1 | 5/2004 | Song et al. |
| 2004/0222999 | A1 * | 11/2004 | Choi et al. ................. 345/589 |
| 2005/0140614 | A1 * | 6/2005 | Baek ............................. 345/87 |
| 2005/0151711 | A1 * | 7/2005 | Baek ............................. 345/88 |
| 2005/0231534 | A1 * | 10/2005 | Lee .............................. 345/690 |

FOREIGN PATENT DOCUMENTS

| CN | 1484071 A | 3/2004 |
| CN | 1614679 A | 5/2005 |
| EP | 1 475 771 A2 | 11/2004 |
| JP | 11295717 H | 10/1999 |
| JP | 2002-149116 A | 5/2002 |
| JP | 2003-295160 A | 10/2003 |
| JP | 2006-139251 A | 6/2006 |
| TW | 573284 | 5/2001 |
| WO | WO 01/37249 A2 | 5/2001 |
| WO | WO 01/37251 A1 | 5/2001 |

OTHER PUBLICATIONS

Office Action issued Feb. 22, 2010 in corresponding Japanese Application No. 2006-172273.

* cited by examiner

*Primary Examiner* — Nitin Patel
(74) *Attorney, Agent, or Firm* — Morgan, Lewis & Bockius LLP

(57) ABSTRACT

A liquid crystal display device includes a first substrate and a second substrate facing and spaced apart from each other, a gate line and a data line on the first substrate, the gate line and the data line crossing each other to define red, green, blue and white sub-pixel regions, a thin film transistor connected to the gate line and the data line, a color filter layer consisting of red, green and blue color filters on the second substrate, the red, green and blue color filters corresponding to the red, green and blue sub-pixel regions, respectively, and a liquid crystal layer between the first substrate and the second substrate.

20 Claims, 7 Drawing Sheets

LIQUID CRYSTAL DISPLAY DEVICE AND METHOD OF DRIVING THE SAME

This application claims the benefit of Korean Patent Application No. 2005-0053818, filed on Jun. 22, 2005, which is hereby incorporated by reference in its entirety.

BACKGROUND OF THE INVENTION

1. Field of the Invention

The present invention relates to a liquid crystal display (LCD) device and a method of driving a liquid crystal display device, and more particularly, to a liquid crystal display device including red, green, blue and white sub-pixel regions and a method of driving the same.

2. Discussion of the Related Art

Among the various types of flat panel display (FPD) devices, liquid crystal display (LCD) devices are widely used as monitors for notebook computers and desktop computers because of their excellent characteristics, such as light weight, portability and low power consumption. Specifically, active matrix type LCD devices having thin film transistors (TFTs) as switching elements have been researched and developed because of their superiority in displaying moving images.

FIG. 1 is a schematic block diagram of a liquid crystal display device according to the related art, and FIG. 2 is a schematic view showing a liquid crystal panel of the liquid crystal display device according to the related art. In FIGS. 1 and 2, the liquid crystal display device includes a liquid crystal panel 2 and a liquid crystal module (LCM) driving circuit 26. The LCM driving circuit 26 includes an interface 10, a timing controller 12, a source voltage generator 14, a reference voltage generator 16, a data driver 18 and a gate driver 20. RGB data and timing sync signals, such as clock signals, horizontal sync signals, vertical sync signals and data enable signals, are input from a driving system (not shown), such as a personal computer, to the interface 10. The interface 10 outputs the RGB data and the timing sync signals to the timing controller 12. For example, a low voltage differential signal (LVDS) interface and transistor transistor logic (TTL) interface may be used for transmission of the RGB data and the timing sync signals. In addition, the interface 10 may be integrated in a single chip together with the timing controller 12.

A plurality of gate lines "GL 1" to "GLn" and a plurality of data lines "DL1" to "DLm" are formed in the liquid crystal panel 2 and are driven respectively by the gate driver 20 and the data driver 18. The plurality of gate lines "GL1" to "GLn" and the plurality of data lines "DL1" to "DLm" cross each other to define a plurality of pixel regions. For each pixel region P, a thin film transistor "TFT" is connected to the corresponding gate line and the corresponding data line, and a liquid crystal capacitor "LC" connected to the thin film transistor "TFT" is formed in each pixel region. The liquid crystal capacitor "LC" is turned on/off by the thin film transistor "TFT," thereby modulating the transmittance of an incident light and displaying images.

The timing controller 12 generates data control signals for the data driver 18, including a plurality of data integrated circuits (ICs), and gate control signals for the gate driver 20, including a plurality of gate ICs. Moreover, the timing controller 12 outputs data signals to the data driver 18. The reference voltage generator 16 generates reference voltages with a digital-to-analog converter (DAC) used in the data driver 18. The reference voltages are set up according to transmittance-voltage characteristics of the liquid crystal panel 2. The data driver 18 determines the reference voltages for the data signals according to the data control signals and outputs the determined reference voltages to the liquid crystal panel 2 to control a rotation angle of liquid crystal molecules.

The gate driver 20 controls the ON/OFF operation of the thin film transistors (TFTs) in the liquid crystal panel 2 according to the gate control signals from the timing controller 12. The gate driver 20 sequentially enables the plurality of gate lines "GL1" to "GLn." Accordingly, the data signals from the data driver 18 are supplied to the pixels in the pixel regions of the liquid crystal panel 2 through the TFTs. The source voltage generator 14 supplies source voltages to elements of the LCD device and a common voltage to the liquid crystal panel 2.

FIG. 3 is a schematic view showing a pixel region of a liquid crystal display device according to the related art. In FIG. 3, a single pixel region consists of three adjacent sub-pixel regions having red, green and blue (RGB) color filters, respectively. The single pixel region displays an image using a color mixture of lights passing through the three adjacent sub-pixel regions.

To improve brightness, a liquid crystal display device including red, green, blue and white (RGBW) sub-pixel regions has been suggested. FIG. 4 is a schematic view showing a pixel region of a liquid crystal display device according to the related art. In FIG. 4, a single pixel region consists of four adjacent sub-pixel regions having red, green, blue and white (RGBW) color filters, respectively. An area ratio of RGB sub-pixel regions with respect to the single pixel region of the LCD device, including RGBW sub-pixel regions, is reduced by about 75% as compared with the LCD device including RGB sub-pixel regions. Thus, a color purity of the LCD device, including RGBW sub-pixel regions, is reduced. However, since the white sub-pixel region is operated to keep a ratio among RGB color signals and a color reproducibility range of RGB colors, the brightness of the LCD device including RGBW sub-pixel regions increases.

Each of the RGBW color filters is formed by coating, exposing and developing a resin having a respective pigment. Thus, a fabrication process of the LCD device including RGBW sub-pixel regions is complicated as compared with the LCD device including RGB sub-pixel regions. As a result, fabrication costs increase.

SUMMARY OF THE INVENTION

Accordingly, the present invention is directed to a liquid crystal display device and a method of fabricating the same that substantially obviate one or more of the problems due to limitations and disadvantages of the related art.

An object of the present invention is to provide a liquid crystal display device including red, green, blue and white sub-pixel regions that is fabricated with a reduced fabrication steps.

Another object of the present invention is to provide a liquid crystal display device including red, green, blue and white sub-pixel regions that is fabricated with a reduced fabrication cost.

Another object of the present invention is to provide a liquid crystal display device including red, green, blue and white sub-pixel regions where a white color filter is omitted, and a method of driving the liquid crystal display device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a first substrate and a second substrate facing and spaced apart from each other, a gate line and a data line on the first substrate, the gate line and the data line crossing each other to define red, green, blue and white sub-pixel regions, a thin film transistor connected to the gate line and the data line, a color filter layer consisting of red, green and blue color filters on the second substrate, the red, green and blue color filters corresponding to the red, green and blue sub-pixel regions, respectively, and a liquid crystal layer between the first substrate and the second substrate.

In another aspect, a method of driving a liquid crystal display device includes outputting a gate control signal, a data control signal and a digital data signal, the digital data signal including a red, green, blue and white digital data signals, adjusting a gray level of the white digital data signal to output an adjusted white digital data signal, converting the red, green, blue and adjusted white digital data signals into red, green, blue and adjusted white analog data signals, supplying the red, green, blue and adjusted white analog data signals to data lines of a liquid crystal panel according to the data control signal, and supplying scan signals to a gate lines of the liquid crystal panel according to the gate control signal.

In another aspect, a method of driving a liquid crystal display device includes outputting a gate control signal, a data control signal and a digital data signal, the digital data signal including a red, green, blue and white digital data signals, outputting first and second gamma reference voltages, converting red, green and blue digital data signals into red, green and blue analog data signals using the first gamma reference voltage, and converting the white digital data signal into a white analog data signal using the second gamma reference voltage, supplying the red, green, blue and white analog data signals to a data line of a liquid crystal panel according to the data control signal, and supplying scan signals to gate lines of the liquid crystal panel according to the gate control signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, similar reference numbers will be used to refer to the same or similar parts.

Figure 1:
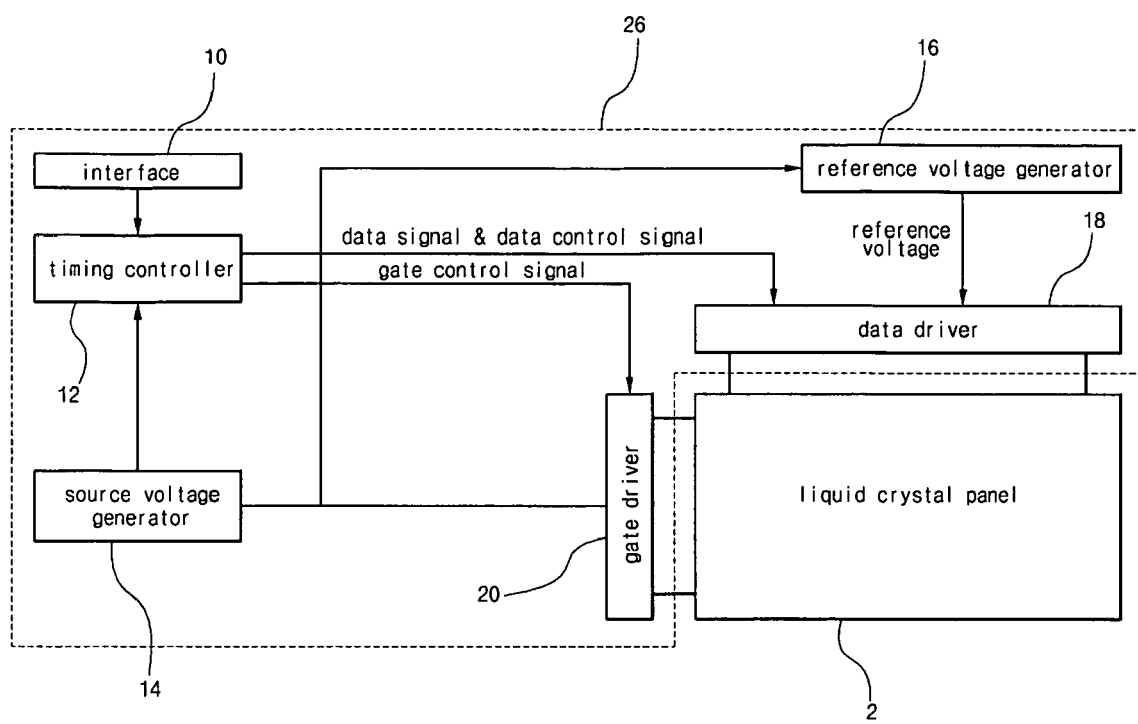
FIG. 1 is a schematic block diagram of a liquid crystal display device according to the related art.
Figure 2:
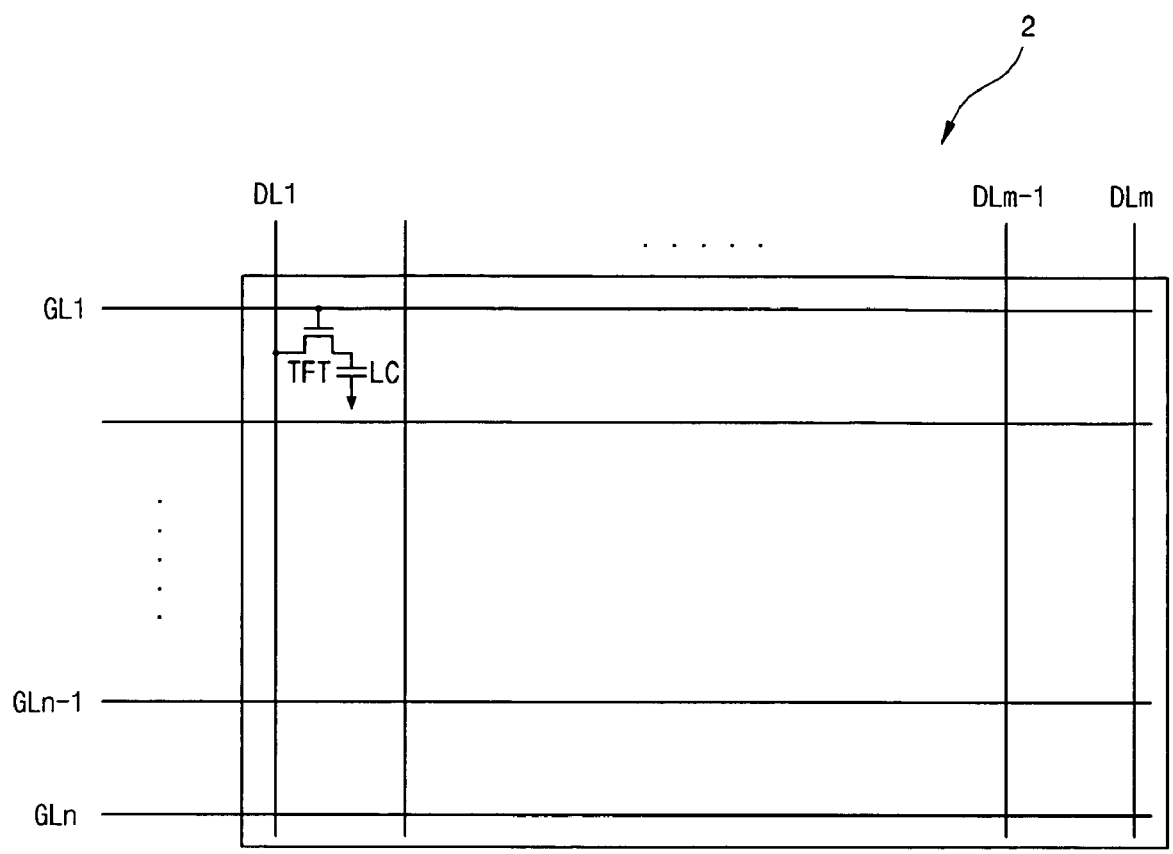
FIG. 2 is a schematic view showing a liquid crystal panel of the liquid crystal display device according to the related art.
Figure 3:
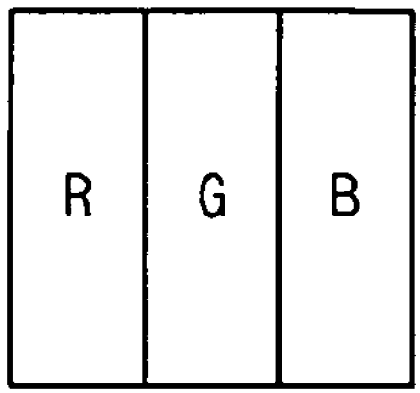
FIG. 3 is a schematic view showing a pixel region of a liquid crystal display device according to the related art.
Figure 4:
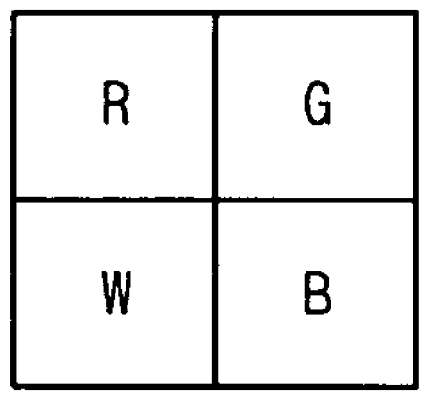
FIG. 4 is a schematic view showing a pixel region of a liquid crystal display device according to the related art.
Figure 5:
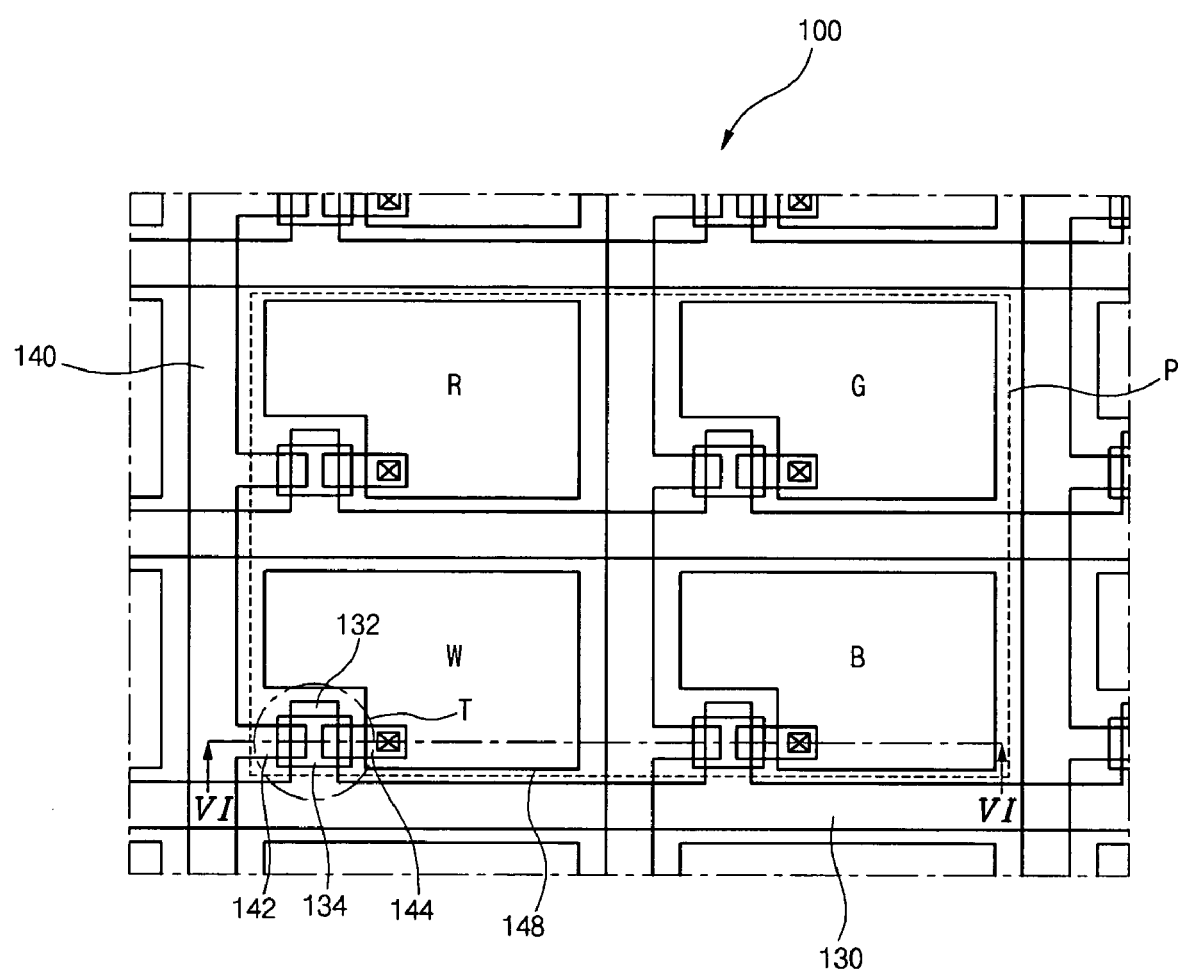
FIG. 5 is a schematic plane view showing a pixel region of a liquid crystal display device according to a first embodiment of the present invention.
Figure 6:
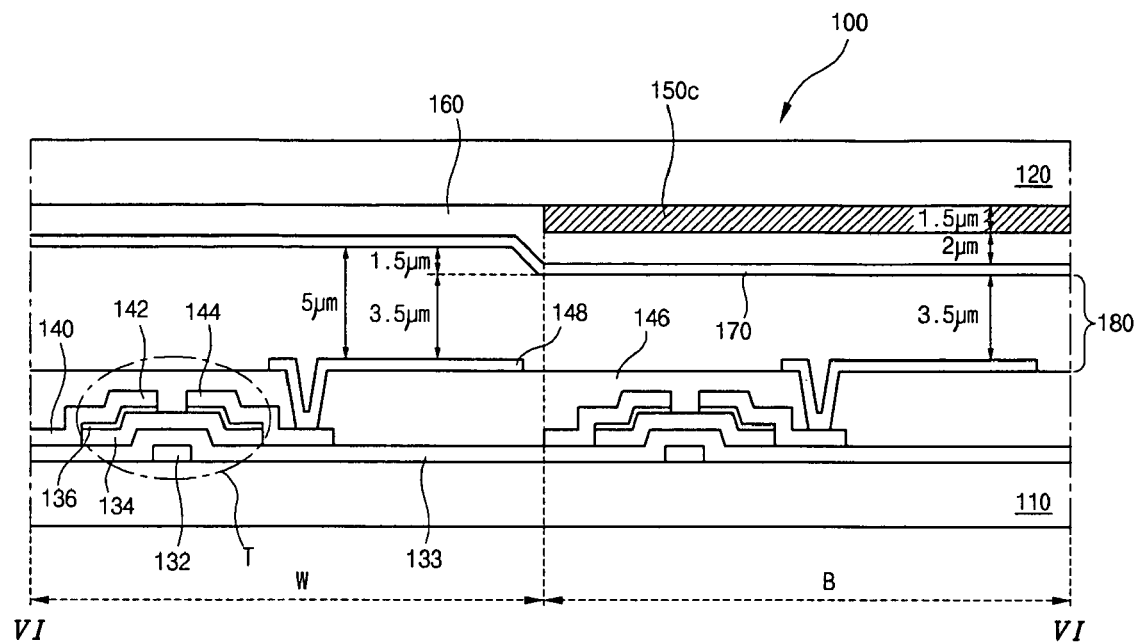
FIG. 6 is a schematic cross-sectional view taken along a line "VI-VI" of FIG. 5.

FIG. 5 is a schematic plane view showing a pixel region of a liquid crystal display device according to a first embodiment of the present invention, and FIG. 6 is a schematic cross-sectional view taken along a line "VI-VI" of FIG. 5. As shown in FIG. 5, a single pixel region "P" of a liquid crystal display (LCD) device 100 includes red, green, blue and white (RGBW) sub-pixel regions, and each sub-pixel region is defined by a gate line 130 and a data line 140 crossing each other. The RGBW sub-pixel regions display red, green, blue and white colored images, respectively. A thin film transistor (TFT) "T" is connected to the gate line 130 and the data line 140, and a pixel electrode 148 is connected to the TFT "T."

As shown in FIG. 6, the LCD device 100 includes a first substrate 110 and a second substrate 120 facing and spaced apart from each other. The TFT "T" including a gate electrode 132, an active layer 134, an ohmic contact layer 136, a source electrode 142 and a drain electrode 144 is formed on the first substrate 110. A gate insulating layer 133 is formed between the gate electrode 132 and the active layer 134, and a passivation layer 146 is formed on the TFT "T." The pixel electrode 148 is formed on the passivation layer 146 and connected to the TFT "T." A blue color filter 150c is formed on the second substrate 120 in the B sub-pixel region, and a protection layer 160 is formed on the blue color filter 150c. Although not shown in FIGS. 5 and 6, red and green color filters are formed on the second substrate 120 in the R and G sub-pixel regions, respectively. In the W sub-pixel region, the protection layer 160 is formed on the second substrate without an intervening white color filter. Since the white color filter is omitted in the W sub-pixel region, fabrication steps for a white color filter such as coating, exposing and developing steps of a white resin are omitted. Thus, fabrication costs for a white color filter are reduced. A common electrode 170 is formed on the protection layer 160. A liquid crystal layer 180 is formed between the pixel electrode 148 of the first substrate 110 and the common electrode 170 of the second substrate 120.

In the LCD device 100, even though the fabrication process is simplified and the fabrication cost is reduced, the W sub-pixel region without a white color filter may cause deterioration, such as a cell gap deviation. As shown in FIG. 6, the W sub-pixel region does not include a white color filter, while the B sub-pixel region includes the blue color filter 150c having a thickness of about 1.5 µm. Accordingly, the common electrode 170 has a step difference of about 1.5 µm between the W and B sub-pixel regions, and the step difference of the common electrode 170 causes a cell gap difference, i.e., a difference in a thickness of the liquid crystal layer 180, between the W and B sub-pixel regions. For example, when a cell gap of the B sub-pixel region is about 3.5 μm, a cell gap of the W sub-pixel region may be about 5 μm and a cell gap difference between the W and B sub-pixel regions may be about 1.5 μm corresponding to the thickness of the blue color filter 150C.

Since a retardation value of the liquid crystal layer depends on the thickness of the liquid crystal layer, the cell gap difference causes a retardation value difference. Accordingly, when the LCD device is designed on the basis of the R, G and B sub-pixel regions, a color coordinate of a data signal for the W sub-pixel region may be different from a color coordinate of a white image displayed in the W sub-pixel region. For example, when the cell gap difference (Δd) is about 1.5 μm and a refractive index anisotropy (Δn) of the liquid crystal layer 180 is about 0.11, the retardation value difference (Δd·Δn) may be about 165 nm between the W and B sub-pixel regions. As a result, color coordinates of a full color image displayed by the LCD device move. Other embodiments of the present invention that provide an LCD device compensating for the color coordinate movements will be illustrated hereinafter.

Figure 7:
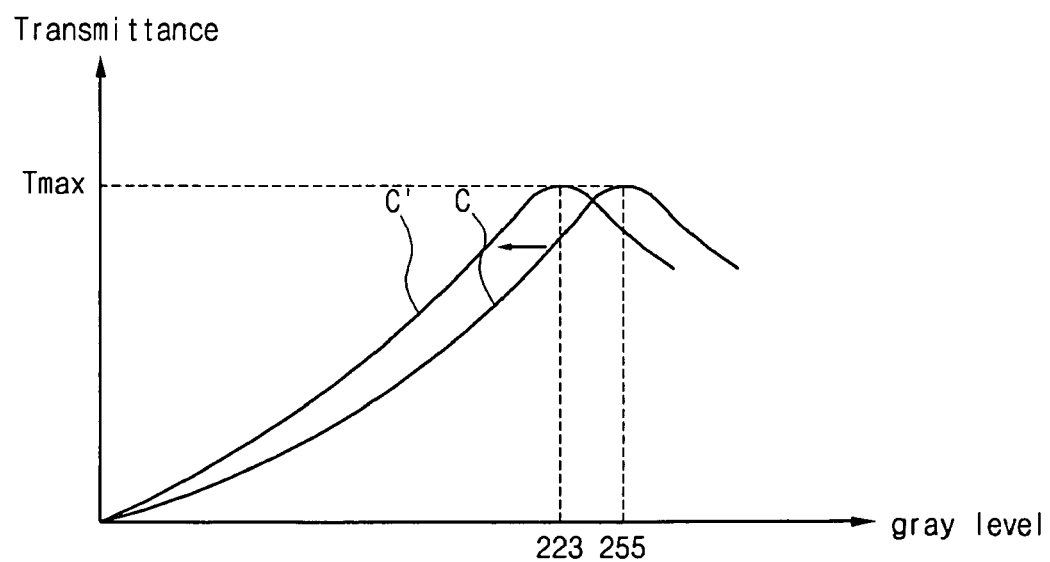
FIG. 7 is a graph showing a transmittance-gray level (T-G) curve of a liquid crystal panel for a liquid crystal display device according to a second embodiment of the present invention.
Figure 8:
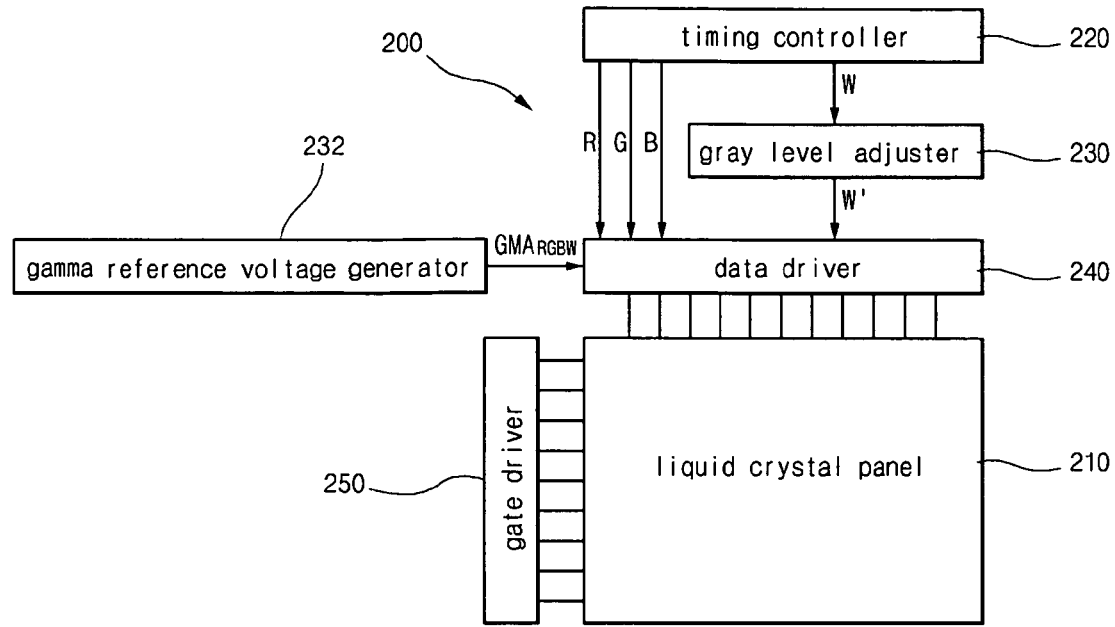
FIG. 8 is a schematic view showing a liquid crystal display device according to the second embodiment of the present invention.

FIG. 7 is a graph showing a transmittance-gray level (T-G) curve of a liquid crystal panel for a liquid crystal display device according to a second embodiment of the present invention, and FIG. 8 is a schematic view showing a liquid crystal display device according to the second embodiment of the present invention. As shown in FIG. 7, a cell gap difference due to an omission of a white color filter causes a color coordinate movement on a T-G curve in a liquid crystal panel of an LCD device. For example, when a cell gap of the W sub-pixel region increases, the T-G curve may change from a first curve "C" to a second curve "C'." Accordingly, a maximum transmittance "Tmax" may be obtained at 223 gray level in a W sub-pixel region without a white color filter, while the maximum transmittance "Tmax" is obtained at 255 gray level in a W sub-pixel region with a white color filter. As a result, a gray level for a required transmittance is reduced in the W sub-pixel region without a white color filter, and the data signal for the W sub-pixel region has a gray level different from the data signal for R, G and B sub-pixel regions.

As shown in FIG. 8, an LCD device 200 includes a liquid crystal panel 210, a timing controller 220, a gray level adjuster 230, a gate driver 250 and a data driver 240. The liquid crystal panel 210 has R, G, B and W sub-pixel regions. In addition, while the R, G and B sub-pixel regions include red, green and blue color filters, respectively, the W sub-pixel region does not include a white color filter. The timing controller 220 outputs a gate control signal, a data control signal and red, green, blue and white digital data signals. The gray level adjuster 230 receives the W data signal and adjusts a gray level of the W data signal to output an adjusted white data signal W'. A gamma reference voltage generator 232 outputs a gamma reference voltage "$GMA_{RGBW}$" for each of the R, G, B and W sub-pixel regions. The data driver 240 receives the data control signal, the gamma reference voltage "$GMA_{RGBW}$" and the red, green and blue digital data signals from the timing controller 220, and the adjusted digital data signal W' from the gray level adjuster 230. Further, the data driver 240 converts the red, green, blue and adjusted white digital data signals RGBW' into red, green, blue and adjusted white analog data signals RGBW' using the gamma reference voltages "$GMA_{RGBW}$" and supplies the red, green, blue and adjusted white analog data signals RGBW' to the red R, green G, blue B and white W sub-pixel regions of the liquid crystal panel 210, respectively. The gate driver 250 output scan signals to the liquid crystal panel 210 according to the gate control signal from the timing controller 220.

In the gray level adjuster 230, the gray level of the W data signal may be lowered to generate the W' data signal when the cell gap of the W sub-pixel region increases. The gray level adjuster 230 may include a look-up table (LUT) for adjusting the gray level W. For example, the optimum gray level for the required transmittance may be reassigned on the basis of the LUT having information regarding a T-G curve movement according to the cell gap difference between the W sub-pixel region and one of the R, G and B sub-pixel regions. In addition, the gray level adjuster 230 may be integrated into the timing controller 220. Since the red, green, blue and adjusted white analog data signals RGBW' are generated considering the cell gap difference, a gray level of a white digital data signal W for the white sub-pixel region is compensated such that a gray level of the full color image displayed by the LCD device 200 is not affected when the W sub-pixel region does not include a white color filter.

Figure 9:
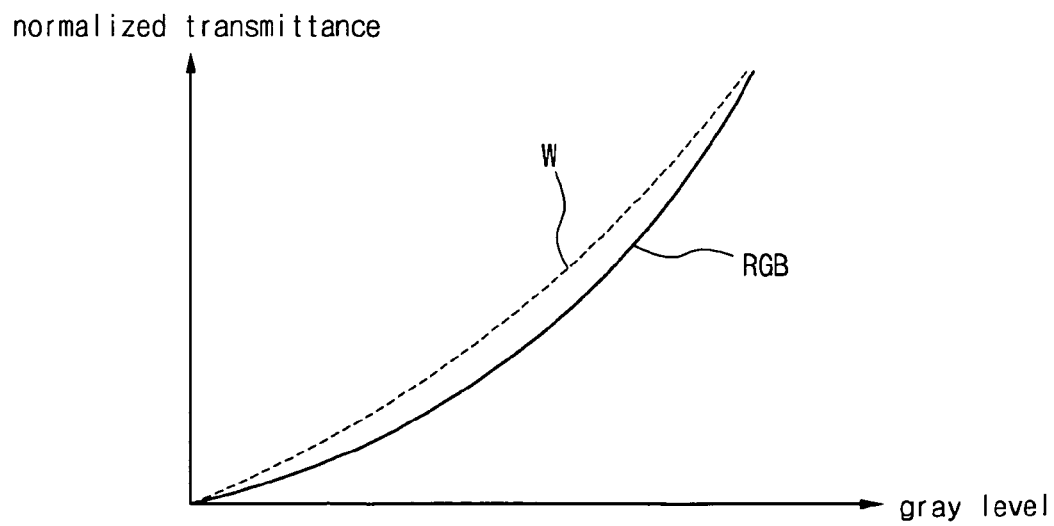
FIG. 9 is a graph showing a normalized transmittance-gray level (nT-G) curve of a liquid crystal panel for a liquid crystal display device according to a third embodiment of the present invention.
Figure 10:
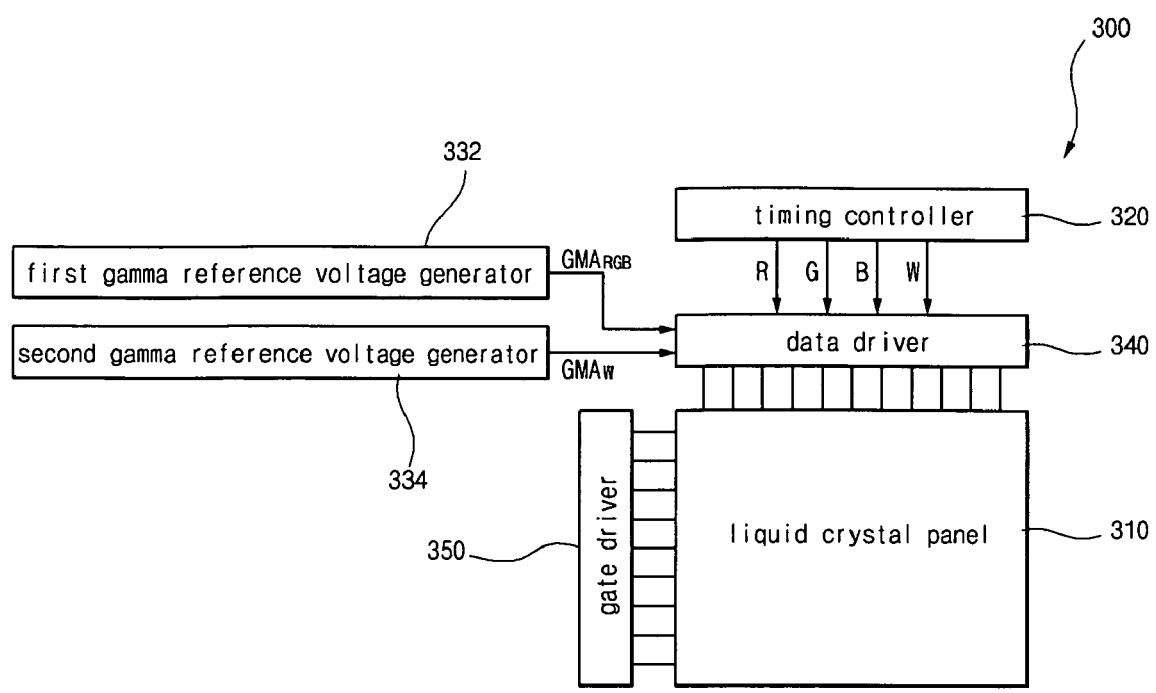
FIG. 10 is a schematic view showing a liquid crystal display device according to the third embodiment of the present invention.

FIG. 9 is a graph showing a normalized transmittance-gray level (nT-G) curve of a liquid crystal panel for a liquid crystal display device according to a third embodiment of the present invention, and FIG. 10 is a schematic view showing a liquid crystal display device according to the third embodiment of the present invention. As shown in FIG. 9, an nT-G curve for a W sub-pixel region is different from an nT-G curve for each of the R, G and B sub-pixel regions. The nT-G curve may be obtained by normalizing a transmittance of a T-G curve. For example, the maximum transmittance may be reassigned to 1 (or 100%) and transmittance values lower than the maximum transmittance may be sequentially reassigned to values between 0 to 1 (or 0% to 100%). The second curve "C'" of FIG. 7 may be normalized to become the nT-G curve for the W sub-pixel region of FIG. 9. According to FIG. 9, the W sub-pixel region has a higher normalized transmittance than the R, G and B sub-pixel regions at a given gray level. To compensate for the difference in the normalized transmittance, different gamma reference voltages may be applied for the W sub-pixel region and each of the R, G and B sub-pixel regions.

As shown in FIG. 10, an LCD device 300 includes a liquid crystal panel 310, a timing controller 320, a first gamma reference voltage generator 332, a second gamma reference voltage generator 334, a gate driver 350 and a data driver 340. The liquid crystal panel 310 has R, G, B and W sub-pixel regions. In addition, while the R, G and B sub-pixel regions include red, green and blue color filters, respectively, the W sub-pixel region does not include a white color filter. The timing controller 320 outputs a gate control signal, a data control signal and digital RGBW data signals. The first gamma reference voltage generator 332 outputs a first gamma reference voltage "$GMA_{RGB}$" for each of the R, G and B sub-pixel regions, and the second gamma reference voltage generator 334 outputs a second gamma reference voltage "$GMA_W$" for the W sub-pixel region. The data driver 340 receives the data control signal and the RGBW data signal from the timing controller 220, and the first and second gamma reference voltages "$GMA_{RGB}$" and "$GMA_W$" from the first and second gamma reference voltage generators 332 and 334. Further, the data driver 340 converts the digital RGBW data signals into the analog RGBW data signals using the first and second gamma reference voltages "$GMA_{RGB}$" and "$GMA_W$," and supplies the analog RGBW data signals to the R, G, B and W sub-pixel regions of the liquid crystal panel 310, respectively. The gate driver 350 output scan signals to the liquid crystal panel 310 according to the gate control signal from the timing controller 320.

In the data driver 340, the digital RGB data signals is converted into the analog RGB data signals using the first gamma reference voltage "$GMA_{RGB}$," and the digital W data signal is converted into the analog W data signal using the second gamma reference voltage "$GMA_W$." The analog RGB data signals and the analog W data signal are supplied to the R, G, B and W sub-pixel regions. The first and second gamma reference voltages "$GMA_{RGB}$" and "$GMA_W$" may be determined on the basis of the nT-G curves for the R, G, B and W sub-pixel regions as shown in FIG. 9. For example, when the cell gap of the white sub-pixel region is greater than the cell gap of one of the red, green and blue sub-pixel regions, the first gamma reference voltage "$GMA_{RGB}$" may be greater than the second gamma reference voltage "$GMA_W$." The first and second gamma reference voltage generators 332 and 334 may be integrated into the timing controller 320. Since the analog RGBW data signals are generated considering the cell gap difference in different sub-pixel regions, a color coordinate of a W data signal for the W sub-pixel region is compensated and a color coordinate of a full color image displayed by the LCD device 200 does not move even when the W sub-pixel region does not include a white color filter.

Consequently, an LCD device according to the present invention includes red, green, blue and white sub-pixel regions such that a white color filter for the white sub-pixel region is omitted. Accordingly, a fabrication process is simplified and a material cost for production is reduced. Furthermore, an LCD device according to the present invention includes elements such as a gray level inverter and two gamma reference voltage generators so that a color coordinate movement due to a cell gap difference between the white sub-pixel region and one of the red, green and blue sub-pixel regions can be compensated. As a result, a display quality is improved in the LCD device even when the white color filter for the white sub-pixel region is omitted.

It will be apparent to those skilled in the art that various modifications and variations can be made in the liquid crystal display device including red, green, blue and white sub-pixel regions and a method of driving the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate and a second substrate facing and spaced apart from each other;
   a gate line and a data line on the first substrate, the gate line and the data line crossing each other to define red, green, blue and white sub-pixel regions;
   a thin film transistor connected to the gate line and the data line;
   a color filter layer consisting of red, green and blue color filters on the second substrate, the red, green and blue color filters corresponding to the red, green and blue sub-pixel regions, respectively;
   a liquid crystal layer between the first substrate and the second substrate;
   a timing controller outputting digital data signals, a gate control signal, and a data control signal, the digital data signals including red, green, blue and white digital data signals;
   a gray level adjuster for adjusting a gray level of the white digital data signal and outputting an adjusted white digital data signal;
   a data driver converting red, green and blue digital data signals from the timing controller and the adjusted white digital data signal from the gray level adjuster into red, green, blue and adjusted white analog data signals, and outputting the red, green, blue and adjusted white analog data signals to the data line according to the data control signal; and
   a gate driver outputting a scan signal to the gate line according to the gate control signal,
   wherein the white digital data signal except the red, green and blue digital data signals is adjusted by the gray level adjuster.

2. The device according to claim 1, wherein the liquid crystal layer in the red, green and blue sub-pixel regions has the same thickness in either one of the red, green and blue sub-pixel regions.

3. The device according to claim 1, wherein the liquid crystal layer in the white sub-pixel region has a different liquid crystal layer thickness than either one of the red, green and blue sub-pixel regions.

4. The device according to claim 3, wherein a thickness of the liquid crystal layer in the white sub-pixel region is greater than a thickness of the liquid crystal layer in either one of the red, green and blue sub-pixel regions.

5. The device according to claim 1, further comprising:
   a pixel electrode connected to the thin film transistor; and
   a common electrode on the color filter layer,
   wherein the common electrode contacts the second substrate in the white sub-pixel region.

6. The device according to claim 5, wherein the liquid crystal layer is interposed between the pixel electrode and the common electrode.

7. The device according to claim 1, wherein the gray level adjuster includes a look-up table having information regarding a transmittance-gray level curve movement according to a difference in a thickness of the liquid crystal layer.

8. The device according to claim 1, wherein the gray level adjuster lowers the gray level of the white digital data signal.

9. The device according to claim 1, wherein the gray level adjuster is integrated into the timing controller.

10. The device according to claim 1, further comprising:
    a gamma reference voltage generator outputting a gamma reference voltage for the red, green, blue and white sub-pixel regions.

11. A liquid crystal display device, comprising:
    a first substrate and a second substrate facing and spaced apart from each other;
    a gate line and a data line on the first substrate, the gate line and the data line crossing each other to define red, green, blue and white sub-pixel regions;
    a thin film transistor connected to the gate line and the data line;
    a color filter layer consisting of red, green and blue color filters on the second substrate, the red, green and blue color filters corresponding to the red, green and blue sub-pixel regions, respectively;
    a liquid crystal layer between the first substrate and the second substrate;
    a timing controller outputting digital data signals, a gate control signal, and a data control signal, the digital data signals including red, green, blue and white digital data signals;
    a first gamma reference voltage generator outputting a first gamma reference voltage;

a second gamma reference voltage generator outputting a second gamma reference voltage;

a data driver converting red, green and blue digital data signals from the timing controller into red, green and blue analog data signals using the first gamma reference voltage except the second gamma reference voltage and converting the white digital data signal from the timing controller into a white analog data signals using the second gamma reference voltage except the first gamma reference voltage, the data driver outputting the red, green, blue and white analog data signals to the data line according to the data control signal; and a gate driver outputting a scan signal to the gate line according to the gate control signal.

12. The device according to claim 11, wherein the first and second gamma reference voltages are determined on the basis of a normalized transmittance-gray level curve according to a difference in a thickness of the liquid crystal layer between the white sub-pixel region and one of the red, green and blue sub-pixel regions.

13. The device according to claim 11, wherein the first gamma reference voltage is greater than the second gamma reference voltage.

14. The device according to claim 11, wherein the first and second gamma reference voltage generators are integrated into the timing controller.

15. A method of driving a liquid crystal display device, comprising:

outputting a gate control signal, a data control signal and a digital data signal, the digital data signal including a red, green, blue and white digital data signals;

adjusting a gray level of the white digital data signal except the red, green and blue digital data signals to output an adjusted white digital data signal;

converting the red, green, blue and adjusted white digital data signals into red, green, blue and adjusted white analog data signals;

supplying the red, green, blue and adjusted white analog data signals to data lines of a liquid crystal panel according to the data control signal; and supplying scan signals to a gate lines of the liquid crystal panel according to the gate control signal.

16. The method according to claim 15, wherein the liquid crystal panel includes red, green, blue and white sub-pixel regions, and the red, green, blue and adjusted white analog data signals are applied to the red, green, blue and white sub-pixel regions, respectively.

17. The method according to claim 15, wherein the adjusted white digital data signal is determined on the basis of a transmittance-gray level curve movement according to a cell gap difference of the liquid crystal panel between the white sub-pixel region and one of the red, green and blue sub-pixel regions.

18. A method of driving a liquid crystal display device, comprising:

outputting a gate control signal, a data control signal and a digital data signal, the digital data signal including a red, green, blue and white digital data signals;

outputting first and second gamma reference voltages;

converting red, green and blue digital data signals into red, green and blue analog data signals using the first gamma reference voltage except the second gamma reference voltage, and converting the white digital data signal into a white analog data signal using the second gamma reference voltage except the first gamma reference voltage;

supplying the red, green, blue and white analog data signals to a data line of a liquid crystal panel according to the data control signal; and supplying scan signals to gate lines of the liquid crystal panel according to the gate control signal.

19. The method according to claim 18, wherein the liquid crystal panel includes red, green, blue and white sub-pixel regions, and the red, green, blue and white analog data signals are applied to the red, green, blue and white sub-pixel regions, respectively.

20. The method according to claim 18, wherein the first and second gamma reference voltages are determined on the basis of a normalized transmittance-gray level curve according to a cell gap difference of the liquid crystal panel between the white sub-pixel region and one of the red, green and blue sub-pixel regions.

* * * * *